Aug. 19, 1969     V. J. PICOZZI     3,462,669
DRIVE SYSTEM FOR SYNCHRONOUS MACHINE
Filed March 22, 1968
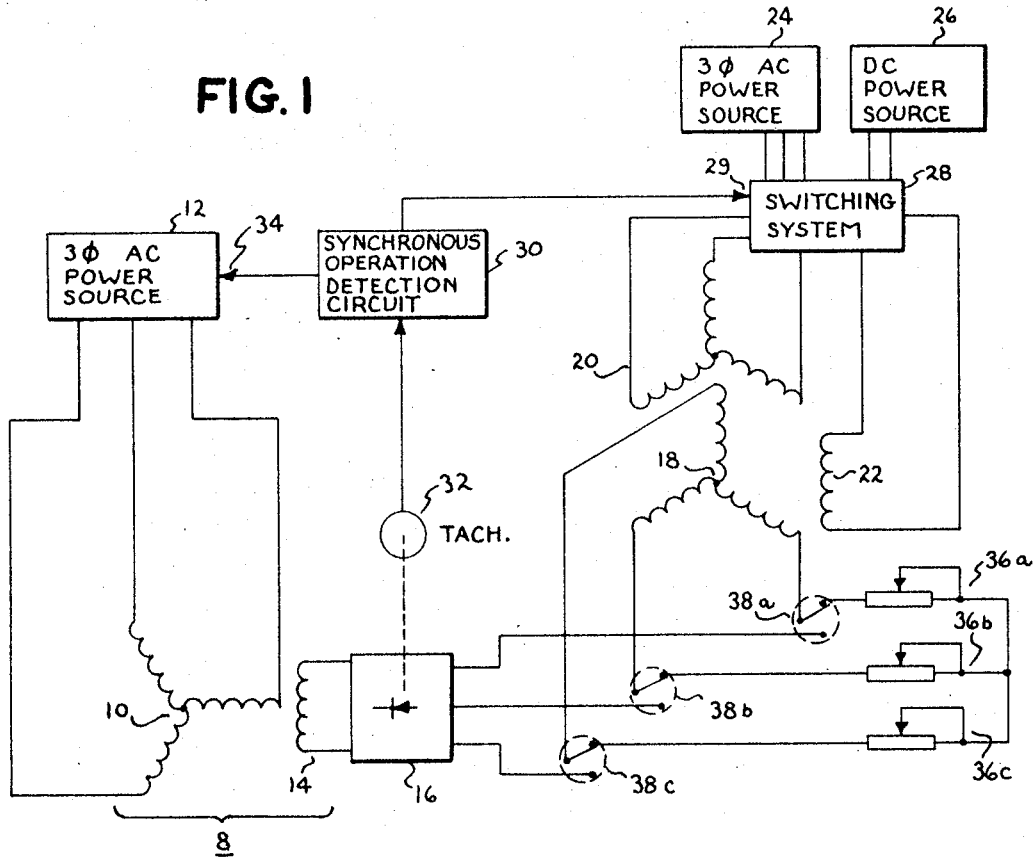
FIG. 1
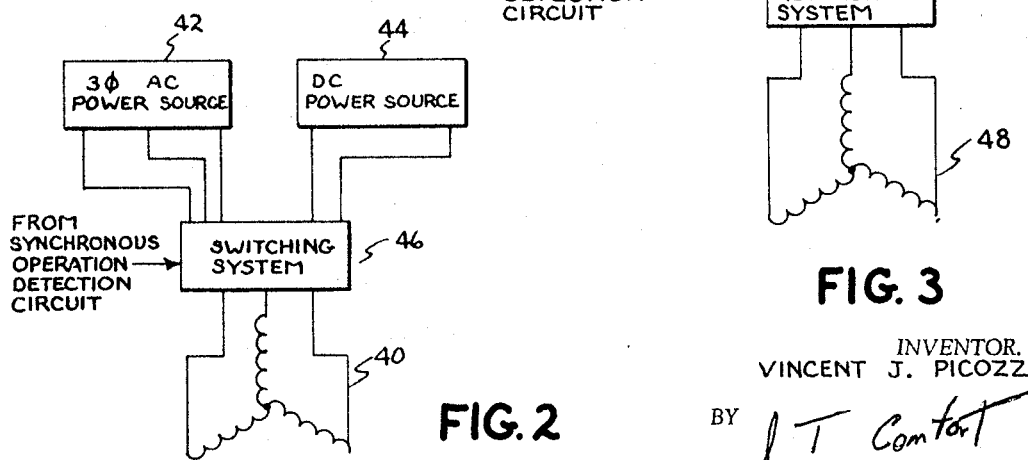
FIG. 2
FIG. 3
INVENTOR.
VINCENT J. PICOZZI
BY J T Comfort
HIS ATTORNEY United States Patent Office 3,462,669
Patented Aug. 19, 1969

3,462,669
DRIVE SYSTEM FOR SYNCHRONOUS MACHINE
Vincent J. Picozzi, Scotia, N.Y., assignor to General
Electric Company, a corporation of New York
Filed Mar. 22, 1968, Ser. No. 715,415
Int. Cl. H02p 5/28, 1/46
U.S. Cl. 318—176
6 Claims

ABSTRACT OF THE DISCLOSURE

A drive system for use with a synchronous machine has a stationary armature winding and a rotatable field winding mounted on a rotatable shaft. The drive system includes a stationary winding means and a rotatable winding means which is electromagnetically coupled to the stationary winding means and is mounted on the rotatable shaft. Means are provided for supplying power to the stationary winding means, as well as a switch means interconnecting the power supplying means and the stationary winding means. The switch means permits the driving system to function in either of two modes of operation. In the first mode of operation, the drive system causes the rotatable winding means to be driven from rest to a speed near the synchronous speed of the machine. In the second mode of operation, the drive system causes the rotatable winding means to serve as a power source for the rotatable field winding of the synchronous machine.

---

The present invention relates to dynamoelectric machines and more particularly to a drive system for a synchronous dynamoelectric machine.

In a common type of synchronous machine system, a wound rotor motor is utilized to drive the rotatable winding of the synchronous machine from rest to a speed near the synchronous speed of the machine. At this point, the stator winding of the synchronous machine is connected to a constant frequency power source such as a commercial power line and the wound rotor motor is taken out of the circuit. At the same time, a small generator or exciter having its armature winding mounted on the same shaft as the field winding of the synchronous machine is brought into the circuit. This exciter, which may be electrically connected to the field winding of the synchronous machine through shaft-mounted rectifiers, serves as a power source for the field winding of the synchronous machine.

The wound rotor motor and the exciter are completely separate machines, each with a full complement of windings. The cost of manufacturing and maintaining these completely separate machines has proven considerable, particularly in view of the fact that the machines are only alternately usable.

The present invention comprehends the use of a drive system for use with a synchronous machine having a stationary armature winding and a rotatable field winding mounted on a rotatable shaft. The drive system includes a stationary winding means and a rotatable winding means which is electromagnetically coupled to the stationary winding means and is mounted on the rotatable shaft. The drive system includes means for supplying power to the stationary winding means, as well as a switch means interconnecting the power supplying means and the stationary winding means. The switch means permits the driving system to function in either of two modes of operation. In the first mode of operation, the drive system causes the rotatable winding means to be driven from rest to a speed near the synchronous speed of the machine. In the second mode of operation, the drive system causes the rotatable winding means to serve as a power source for the rotatable field winding of the synchronous machine.

While the specification concludes with claims particularly pointing out and distinctly claiming that which is regarded as the present invention, the invention itself along with its further objects and advantages may be more readily ascertained from the following detailed description when read in conjunction with the accompanying drawing in which:

FIGURE 1 is a circuit diagram, partially in block form, of a synchronous machine having a drive system constructed in accordance with the present invention;

FIGURE 2 is a circuit diagram showing an alternate embodiment of a portion of a drive system constructed in accordance with the present invention; and FIGURE 3 is another alternate embodiment of a drive system constructed in accordance with the present invention.

In the system shown in FIGURE 1, a main synchronous machine 8 includes a stationary polyphase winding 10 adapted to be energized when the main machine 8 is operating at synchronous speeds by a three-phase A-C power source 12. The main machine 8 includes a rotatable D-C field winding 14 adapted to be energized when the main machine 8 achieves synchronous speed by a voltage which is generated in a below-described generator or exciter and is rectified by a plurality of shaft-mounted rectifiers represented symbolically at 16. The field winding 14 is mounted on a rotatable shaft (not shown) along with a rotatable polyphase winding means 18 for a drive system for the main machine. The rotatable polyphase winding 18 of the drive system may be connected either to the shaft-mounted rectifiers 16 or to a set of variable starting resistances 36a, 36b, and 36c through contacts 38a, 38b, and 38c.

The rotatable polyphase winding 18 is electromagnetically coupled to a stationary winding means which may include a polyphase winding 20 and a D-C winding 22 mounted in non-inductive relationship to the polyphase winding 20. Power supplying means for the stationary winding means in this embodiment of the invention includes a three-phase A-C power supply 24 for the polyphase winding 20 and a D-C power supply 26 for the D-C winding 22. Interposed between the power supplies 24 and 26 and their respective windings 20 and 22 is a switch means including a switching system 28, the operation of which is controlled by a synchronous operation detection circuit 30 connected to the switching system 28 at an input 29. The detection circuit 30, which is responsive to the speed of rotation of the D-C field winding 14 as sensed by a tachometer 32, has a second output 34 for controlling the electrical connection between the power source 12 and the stationary polyphase winding 10 of the main machine 8.

The above-described system has two different modes of operation. In the first or starting mode of operation, the drive system serves as a starting motor for the main machine 8. During this first mode of operation, the stationary polyphase winding 20 is connected to the three-phase A-C power source 24 whereas the rotatable polyphase winding 18 is connected to the variable starting resistances 36a, 36b, and 36c. The rotatable polyphase winding 18 and the D-C field winding 14 of the main machine are brought slowly up to a speed near the synchronous speed of the main machine by maintaining a three-phase A-C voltage across winding 20 while slowly decreasing the value of the resistances 36a, 36b, and 36c from their maximum to zero.

When the speed of rotation of the D-C field winding 14 of the main machine closely approaches the synchronous speed of the machine, the second or exciting mode of operation begins. More particularly, the detection circuit 30 responds to a signal from the tachometer 32 to produce an output signal at 34 which effectively connects the power source 12 to the stationary winding 10 of the main machine 8. At the same time, the detection circuit produces an output signal at 29 which effectively disconnects the three-phase A-C power source 24 from the stationary polyphase winding 20 and connects the stationary D-C winding 22 to the D-C power source 26. At the same time, the position of the contacts 38a, 38b, and 38c is changed to connect the output of the rotatable polyphase winding 18 to the shaft-mounted rectifiers 16. Since the stationary polyphase winding 10 of the main machine 8 is energized by the line voltage of the source 12 and its field winding 14 is excited through the rectifiers 16, the main machine 8 will operate as a synchronous motor. In doing so it will drive the rotatable polyphase winding 18 which, being subject to a D-C field established by the stationary D-C field winding 22, now serves as an A-C generator or exciter rather than as a starting motor.

From the aforegoing it is clear that the rotatable polyphase winding 18 serves equally well in both the first or starting and the second or exciting mode of operation of the drive system, thereby obviating the need for a completely separate machine for each of these modes of operation.

In the alternate embodiment of the invention shown in FIGURE 2, the stationary polyphase winding 18 and the stationary D-C field winding 22 of FIGURE 1 have been replaced by a stationary winding means consisting of single stationary polyphase winding 40 adapted to be energized by a power supplying means which alternately consists of a three-phase A-C power source 42 and a D-C power source 44 capable of delivering high currents at low voltages. As in the above-described system, the stationary polyphase winding 40 is connected to the three-phase A-C power source 42 through a switching system 46 during the first or starting mode of operation, but is switched over to the D-C power source 44 when the speed of rotation of the field winding of the main machine approaches synchronous speed.

In a second alternate embodiment shown in FIGURE 3, the separate power sources for the drive system have been eliminated. In this second alternate embodiment, a stationary polyphase winding 48 is connected through a phase rotation reversing system 50 to a three-phase A-C power source 52. In the first or starting mode of operation, the phase rotation of the voltage applied to the stationary polyphase winding 48 is such that the voltages across the winding 48 drive the rotatable winding from the rest to a speed near synchronous speed of the machine. When the speed near the synchronous speed of the main machine is reached, a signal is applied to the phase rotation reversing system 50 from the synchronous operation detection circuit to cause the phase rotation of the voltage applied to the polyphase winding 48 to be reversed. The effect of the reversal of phase rotation is to establish a voltage wave across the winding 48 which travels around the periphery of the winding in the direction opposite that in which the rotatable winding is driven. Since the rotatable winding cuts through the flux lines established by this voltage wave, it will begin to act as a voltage generator, thereby changing the drive system from its first or starting mode to its second or its exciting mode of operation.

In these embodiments additional windings may be needed to match voltages for the equipment or supplies.

While there has been described what are regarded at present as preferred embodiments of the present invention, it is obvious that variations and modifications therein will occur to those skilled in the art. Therefore, it is intended that the appended claims shall cover all such variations and modifications as fall within the true spirit and scope of the invention.

What I claim as new and desire to secure by Letters Patent of the United States is:

1. For use with a synchronous machine having a stationary armature winding and a rotatable field winding mounted on a rotatable shaft, a drive system comprising:
    (a) stationary winding means;
    (b) rotatable winding means disposed on the rotatable shaft and electromagnetically coupled to at least part of said stationary winding means;
    (c) means for supplying power for said stationary winding means; and
    (d) switch means interconnecting said power supplying means and said stationary winding means to permit said drive system to function in a first mode of operation wherein said rotatable winding means is driven from rest to a speed near the synchronous speed of the machine or in a second mode of operation wherein said rotatable winding means serves as a power source for the rotatable field winding of the synchronous machine.

2. A drive system as recited in claim 1 wherein said switch means includes means responsive to the speed of the rotatable field winding of the synchronous machine to cause said drive system to assume its second mode of operation when the speed of the rotatable field winding closely approaches the synchronous speed of the machine.

3. A drive system as recited in claim 2 wherein said power supplying means includes a source of A-C power and a separate source of D-C power.

4. A drive system as recited in claim 3 wherein said stationary winding means includes a polyphase winding adapted to be connected to said source of A-C power when said drive system is operating in its first mode and a D-C field winding adapted to be connected to said source of D-C power when said drive system is operating in its second mode, said polyphase winding and said D-C field winding being mounted in non-inductive relationship to one another.

5. A drive system as recited in claim 2 wherein said power supplying means comprises a source of three-phase A-C power and said switch means includes means for reversing the phase rotation of the A-C power when the speed of the rotatable field winding of the synchronous machine closely approaches the synchronous speed of the machine.

6. A drive system as recited in claim 3 wherein said stationary winding means comprises a single polyphase winding.

References Cited

UNITED STATES PATENTS 3,100,279    8/1963    Rohner _____ 318—167
3,293,518    12/1966    Neumann _____ 318—176

WARREN E. RAY, Primary Examiner

U.S. Cl. X.R.
318—181, 193; 330—61